United States Patent [19]

Hopkins et al.

[11] 3,898,884

[45] Aug. 12, 1975

[54] INDOOR/OUTDOOR THERMOMETER

[75] Inventors: Evan Lloyd Hopkins; Ross Eugene Hopkins, both of Emporia, Kans.

[73] Assignee: Hopkins Manufacturing Company, Emporia, Kans.

[22] Filed: Aug. 6, 1973

[21] Appl. No.: 385,813

[52] U.S. Cl.............. 73/339 C; 73/340; 73/343 R; 73/363.7
[51] Int. Cl.²... G01K 1/06; G01K 1/14; G01K 5/62
[58] Field of Search... 73/339 C, 340, 343 R, 363.7, 73/374, 376

[56] References Cited
UNITED STATES PATENTS

| | | | |
|---|---|---|---|
| 1,641,500 | 9/1927 | Paul | 73/376 |
| 2,235,252 | 3/1941 | Bradley | 73/363.7 |
| 2,803,137 | 8/1957 | Bradley | 73/363.7 |
| 2,839,924 | 6/1958 | Pauli | 73/363.7 X |
| 2,964,947 | 12/1960 | De Jong | 73/343 R X |
| 3,177,717 | 4/1965 | Oveson | 73/340 |
| 3,196,684 | 7/1965 | Vernon | 73/340 |
| 3,518,884 | 7/1970 | Wood | 73/374 |

*Primary Examiner*—Richard C. Queisser
*Assistant Examiner*—Frederick Shoon
*Attorney, Agent, or Firm*—Burns, Doane, Swecker & Mathis

[57] ABSTRACT

An indoor/outdoor thermometer comprised of separate indoor and outdoor temperature indicating units is disclosed for simultaneously providing a relative temperature indication on two sides of a sheet of transparent material in conjunction with a single graduated scale disposed on one of the units. Alignment surfaces are provided to align the indoor unit with respect to the outdoor unit and with respect to the graduated scale, and means are provided to attach the indoor temperature indicating unit relatively independently of the outdoor temperature indicating unit. In addition, moisture control means may be provided.

10 Claims, 3 Drawing Figures

PATENTED AUG 12 1975 3,898,884

SHEET 1

INDOOR/OUTDOOR THERMOMETER

BACKGROUND OF THE INVENTION

The present invention relates generally to temperature indicating devices and more particularly to an indoor/outdoor thermometer.

It has become desirable and advantageous to know the temperature both indoors and outdoors for a variety of reasons which include, for example, the ability to properly dress for outdoor tempertures or for purpose of evaluation of air conditioning equipment.

A wide variety of indoor/outdoor thermometers have been at least theorized in various forms and constructions. In the past, many indoor/outdoor thermometers have been designed with a plurality of temperature reading scales mounted on a generally unitary base for placement indoors. A remote temperature sensing element located outdoors is then connected to one of the reading scales indoors.

In addition, there are known indoor/outdoor thermometers such as that disclosed in the U.S. Pat. No. 3,177,717 to Oveson, wherein a pair of independent thermometers are carried by a single mounting member in such a manner that a first thermometer is positioned on the outer side of a window, and a second thermometer is positioned on the inner side thereof. More specifically, two independent thermometers, each having a scale and being independently readable of each other, are connected together and are supported by a generally U-shaped mounting member which is seated over the top edge of a window.

While the Oveson type indoor/outdoor thermometer may be entirely satisfactory in many applications, room for improvement remains. In this connection, the Oveson device may not be utilized in homes or office buildings having floor to ceiling windows or other types of large windows which are permanently mounted in a single position and which do not open and close. Moreover, the mounting member of the Oveson type indoor/outdoor thermometer may interfere with the porper weather sealing properties of certain conventional windows. Similarly, indoor/outdoor thermometers utilizing an outdoor temperature sensing element communicable with a reading scale indoors require a relatively burdensome arrangement for placing these elements in communication with each other. For example, in some instances a perforation may have to be made in the wall separating the outdoor sensing element from the indoor reading scale. It may be found with conventional indoor/outdoor thermometers that undesirable heat transfer may take place as a result of a perforation required by such conventional devices or as a result of an improperly sealed window.

At least one further known indoor/outdoor thermometer is disclosed in U.S. Pat. No. 3,196,684 to Vernon, Sr. This patent discloses an indoor/outdoor thermometer device for an automobile side ventilation window wing which utilizes a U-shaped clip to connect together an inside bulb-type thermometer with a similar outside unit. As noted above, however, such a device may interfere with the proper weather sealing properties of certain windows or otherwise be unsuitable for certain applications. For example, this U-shaped clip may interfere with the proper closing of some automobile windows or, with other types of automobiles, may be unusuable as a result of an absence of the side ventilation window.

As a result of undesirable heat transfer from improperly sealed windows, the temperature readings in the vicinity of the temperature sensing elements of known devices may not provide an accurate indication of the relative temperature differences between indoors and outdoors.

In conventional indoor/outdoor thermometers utilizing a a separate temperature indicating device to provide an outdoor reading, rain or water from other sources may accumulate within the housing or in proximity to the outdoor temperature indicating device. The dampness associated with such moisture may be detrimental to the temperature indicating mechanism housed therein and may, moreover, affect the accuracy of the temperature indicating device. In addition, moisture may encourage a condensation of water particles on the face of the temperature indicating device through which readings are made. This "fogging" effect substantially impedes the ability to read such a temperature indicating device.

Some conventional temperature indicating devices utilize housings which are effectively air tight. Such air tight housings function to trap a volume of air therein. The temperature of this volume of air will be the temperature indicated by the indicating means. However, as the air outside the temperature indicating means changes, the trapped air within the temperature indicating means housing tends to insulate the temperature sensing means from the air outside the housing with a result that a time lag may occur between the time the air surrounding the thermometer changes and the temperature indicating means reflects such change.

Recognizing the need for an improved indoor/outdoor thermometer, it would, therefore, be desirable to provide a novel indoor/outdoor thermometer which could provide an accurate and simultaneous reading of the temperature indoors and outdoors and which indoor/outdoor thermometer would in no way interfere with the proper operation of the window to which it is attached.

It is therefore a general object of the present invention to provide a novel indoor/outdoor thermometer which minimizes or reduces the problems of the type previously noted.

It is a more particular object of the present invention to provide an indoor/outdoor thermometer which may be utilized in conjunction with a window and which minimizes interference with the operation of said window and which may be attached at any preselected position thereon.

It is a specific object of the present invention to provide an indoor/outdoor thermometer which may be securely affixed to a window for providing a simultaneous reading of both indoor and outdoor temperatures independent of a holding bracket extending around the edge of the window or a connecting member extending through the window.

Another object of the present invention is to provide an indoor/outdoor thermometer which may be read in conjunction with a single graduated scale.

It is likewise an object of the present invention to provide an indoor/outdoor thermometer wherein the temperature of either the indoors or the outdoors may be relatively quickly determined and, in addition, the relative difference in such temperatures may be relatively quickly and easily determined at a single glance by the user.

Of independent significance is the object of the present invention to provide an indoor/outdoor thermometer which substantially eliminates the accumulation of moisture within the housing of the temperature indicating device.

In addition, it is an object of the present invention to provide an indoor/outdoor thermometer that substantially eliminates the time lag associated with a change in temperature of surrounding air and a change in the temperature indicating device.

Yet another object of the present invention is to provide for improved accuracy in an indoor/outdoor thermometer by eliminating erroneous readings caused by heat transfer between the temperature indicating apparatus and the window to which the apparatus is attached.

Another object of the present invention is to provide an indoor/outdoor thermometer which will provide improved accuracy by reason of having eliminated a mounting bracket which may cause a heat transfer between indoors and outdoors.

Finally it is an object of the present invention to provide an indoor/outdoor thermometer which is rugged, durable, long-lived, and which provides for easy and economical manufacture.

An indoor/outdoor thermometer according to a preferred embodiment of the present invention intended to accomplish at least some of the foregoing objects includes a bisegmental temperature indicating apparatus for simultaneously providing a relative temperature indication in connection with an outdoor side of the sheet of transparent material and an indoor side of the sheet of transparent material and including a first bimetallic sensing apparatus attachable to an indoor side of the sheet of transparent material, a first pointer responsive to the first temperature sensing apparatus for providing a relative indication in response to an indoor temperature, a second bimetallic sensing apparatus attachable to the outdoor side of a sheet of transparent material, a second pointer responsive to the second sensing apparatus for providing a relative indication in response to the temperature outdoors, a graduated scale cooperable with said first and second bimetallic temperature sensing means for simultaneously providing on a single scale temperature readings for the indoor side and the outdoor side of the transparent material and alignment means for aligning the first and second temperature sensing apparatus and the graduated scale in order to permit a temperature reading of the indoor side and the outdoor side of the sheet of transparent material to be taken simultaneously in connection with the single graduated scale. The indoor/outdoor thermometer may include an air circulation panel and a moisture exit. In addition, double faced adhesive tape may be used to affix the apparatus to the sheet of transparent material.

Other objects and advantages of the present invention will become apparent with reference to the following detailed description of a preferred embodiment thereof in connection with the accompanying drawings, wherein like reference numerals have been applied to like elements, in which:

THE DRAWINGS

DETAILED DESCRIPTION OF A PREFERRED EMBODIMENT OF THE INVENTION

Figure 1:
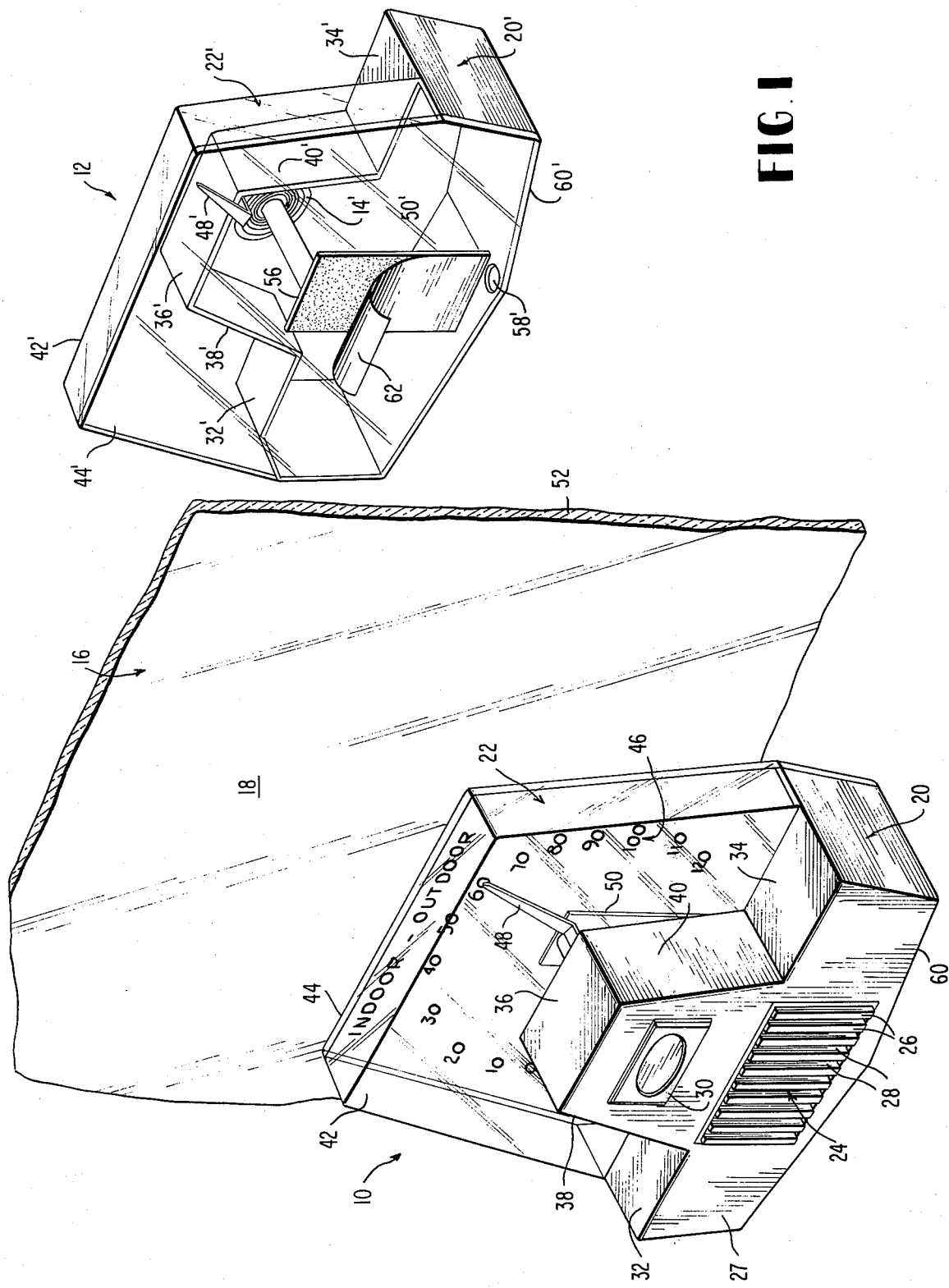
FIG. 1 is an exploded axonometric projection of a preferred embodiment of the present invention.

With reference now to FIG. 1, there can be seen in an exploded fashion, an indoor/outdoor thermometer according to the present invention. Two temperature indicating units 10, 12 are shown which utilize a bimetallic coil 14 as a primary temperature sensing means. No invention is claimed in such temperature sensing means, it being sufficient, however, that such means be of any suitable construction to respond to the temperature in the location in which they are situated. Hence, temperature sensing means of various types which are commercially available my be used in accordance with the description which follows.

Looking firstly to the unit 10 which may most often be mounted on the indoor side 16 of a sheet of transparent material 18 e.g., a window pane, there is depicted a housing having a body portion 20 and a window portion 22.

The body portion 20 contains an air circulation panel 24 comprised of plurality of alternately spaced bar-like members 26 which extend slightly from a frontal plane 27 of the body portion 20. These spaced apart bar-like members 26 define a set of passages 28 through which air may pass into and out from the unit 10. The frontal plane 27 may also carry a logo 30 or other inscription or trademark of the manufacturer.

The body portion 20 further comprises a left land 32, a right land 34 and a center land 36. The body also comprises a left upstanding surface 38 and a right upstanding surface 40. These surfaces and landings are utilized in the alignment of the indoor unit 10 with the indoor unit 12 as will be described in greater detail below.

The window portion 22 of the unit 10 comprises a front face 42 and a back face 44. A graduated scale 46 of a suitable temperature range, e.g., $-20°$ to $120°F$, may be printed, etched or otherwise appropriately attached to the back face 44 of the window portion. It will be appreciated that the outdoor unit 12 does not have a graduated scale attached thereto in the present embodiment. Since indoor temperature readings are made in relation to the position of a pointer 48 which is viewed through the transparent front face 42, it is preferred that the front face be made from a material having a sufficient optical clarity to avoid erroneous readings. The front face portion 42 should, therefore, be free of distortion and clouding.

The unit 10 may be attached to the sheet of transparent material 18 by means of a double faced adhesive tape 50 attached to the back face portion 44 of the unit 10. As will become more apparent below, this double faced adhesive tape is preferably affixed to the back face at a point below the center land 36 of the body portion 20 of the unit 10 to avoid interference with readings taken in connection with a pointer 48' of the outdoor unit 12. By being so adhesively affixed to the sheet of transparent material 18, no fastening means, e.g., a clamp, need be passed across a boundary edge 52 of the transparent material.

Figure 2:
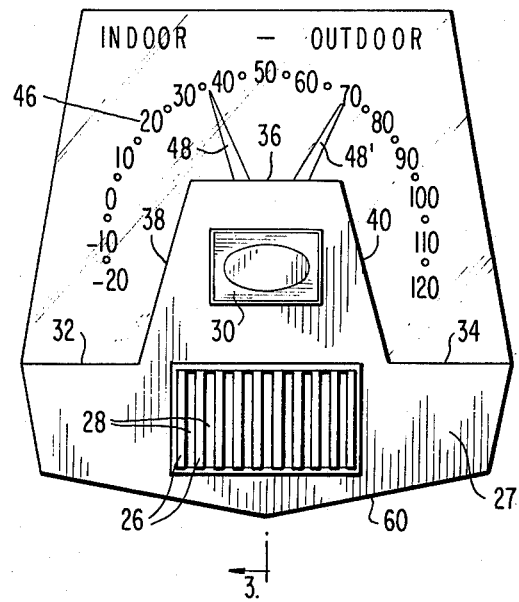
FIG. 2 is a front or elevational view of the indoor/outdoor thermometer illustrated in FIG. 1 which would be observed by the user of the invention during operation.

Looking now at FIG. 2, there can be seen a front view of the indoor/outdoor thermometer of the present invention as it would be observed by a user during operation. The pointer 48 of the indoor unit 10 and the pointer 48' of the outdoor unit 12, both of which are observable through the window portion 22 of the indoor unit, provide in conjunction with the graduated scale 46, an instantaneous reading of the temperatures in these zones respectively Moreover, the angular displacement of these pointers provides an indication of the relative difference in temperature between these zones.

The left land 32, center land 36 and right land 34 and the left and right upstanding surfaces 38, 40 of the indoor unit 10 have been aligned to correspond to a left land 32', center land 36', and right land 34' and left and right upstanding surfaces 38', 40' of the outdoor unit (see FIG. 1). It will be noted, that the conventions "left" and "right" are used with reference to the present invention when the same is viewed from the indoors as shown in FIG. 2. It has been found that these surfaces provide a means for aligning the indoor and the outdoor unit. These alignment surfaces cooperate to indicate whether one unit is rotated or angularly displaced with respect to the other and also provide an indication as to whether one unit is offset (e.g., to the left or to the right of the other unit). It may be found that the left 32, 32' and right 34, 34' lands may be used to provide angular alignment and that the center land 36, 36' and left 38, 38' and right 40, 40' upstanding surfaces may be used to correct an offset alignment.

Figure 3:
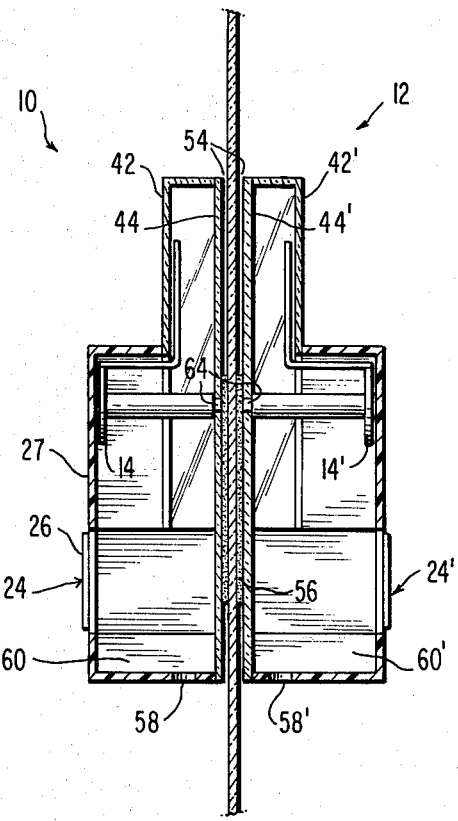
FIG. 3 is a sectional side view taken along section line 3—3 in FIG. 2.

In FIG. 3 there is illustrated a cross-sectional view along the line 3—3 in FIG. 2. It can be seen that an air space 54, defined by the back face 44, 44' of each unit and the sheet of transparent material 18, is provided as a result of the thickness of the double faced adhesive tape 50, 50'. This air space prevents the temperature of the transparent material 18 itself from either transferring or absorbing heat from the faces 44, 44' of either the indoor or outdoor unit. In addition, the double faced adhesive tape 50 comprises a layer of foam-like material 56 which further insulates each of the units from the temperature of the transparent material.

The air circulation panels 24, 24' place the exterior temperature zones in fluid communication with the interior of each of the units respectively. In addition to placing the air surrounding each unit in contact with the bimetallic element 14, 14' therein, the air circulation panels help maintain the same temperature on the interior and exterior portions of the front faces 42, 42' and on the interior portion and exterior portion of the back faces 44, 44' in order to prevent a condensation of moisture. It will be appreciated that such a condensation of moisture would be an impediment to the ability to accurately read the indoor/outdoor thermometer of the present invention. In addition, by removing the back face 44, 44' from contact with the sheet of transparent material on both the indoor and outdoor units, there is provided an improved ability to maintain control over condensation or other moisture.

The air circulation panels 24, 24' are disposed generally below the level at which the bimetallic coils 14, 14' are attached to the body portions of each unit. During inclement weather, it may be possible for some rain to enter the body portion of the outdoor unit 12. Similarly, if the indoor unit 10 is placed in an environment where it may be likely to be sprayed with water, any water which would enter the body portion would do so below the position of the bimetallic element. Hence, the chance of damaging the bimetallic element or coil as a result of its coming into contact with the rain or other water is thereby minimized. In the event that water does enter the housing, a drain 58, 58' is provided in the body portion of the indoor and the outdoor units, respectively (see FIGS. 1 and 3). This drain is preferably disposed at the lowest point in the body portion to provide for satisfactory drainage of the water. To enhance such drainage, an inclined surface 60, 60' is provided in each unit.

A screw means 64 (FIG. 3) is provided on both the indoor and the outdoor units for calibrating the bimetallic temperature sensors of each of the units respectively. Once calibration has been achieved, the double faced adhesive tape may be placed over the calibration access port to prevent tampering.

In operation, the outdoor unit 12 is mounted first on the outdoor portion of the sheet of transparent material 18. It will of course be appreciated that this sheet of transparent material 18 may be a window between the indoors and the outdoors or may be a window separating one indoor temperature zone from another indoor temperature zone. In any event, the surface to which the outdoor unit is attached should be cleaned and made free of grease or other such substances in order to provide for satisfactory adhesion of the double faced adhesive tape 50. This double faced adhesive tape may have a protective covering 62 which is removed prior to attachment as shown in FIG. 1. The outdoor thermometer 12 is then placed firmly against the sheet of transparent material 18 as nearly level as possible. The indoor portion of the sheet of transparent material is similarly prepared by appropriate cleaning. Before the indoor unit 10 is attached to the surface of the transparent material, care should be taken to align the indoor unit with the now affixed outdoor unit. The left and right lands 32, 34 may be used to achieve angular alignment. The central land 36 and the left and right upstanding surfaces 38, 40 may be used to eliminate any offset such that the pointers 48, 48' are arranged to travel in superimposed paths along the graduated scale 46 (FIG. 2). Once properly aligned, the indoor unit is then pressed against the transparent material. It will, of course, be appreciated that this procedure may be conducted in reverse, i.e., the indoor thermometer may be mounted first.

After an appropriate time has passed for each of the bimetallic coils 18 to achieve thermal equilibrium, this two part or bisegmental thermometer assembly may be then read by viewing the assembly through the window portion of the indoor unit. The pointer 48 of the indoor unit, which may be of a first color, e.g., red, will provide an indication of the temperature indoors on the graduated scale 46. The pointer 48' of the outdoor unit which may be of another color, e.g., green, will come to a position corresponding to the temperature of the outdoor zone. This pointer indicator 48' may also be viewed in relation to the graduated scale disposed on the window portion of the indoor unit. It will be appreciated that the pointer of the outdoor unit 12 is viewed through the window portion 22 of the indoor unit 10, the sheet of transparent material 118 and the back face 44' of the outdoor unit. Hence, by viewing the assembly through the front face 42 of the indoor unit, the temperature of both the indoors and the outdoors may be determined in relation to the graduated scale 46 on the indoor unit 10. The relative difference in temperature may be determined, in addition to actually subtracting the two temperature indications, by observing the angular displacement between the pointers.

SUMMARY OF ADVANTAGES

It will be appreciated that in constructing an indoor/outdoor thermometer according to the present invention, certain significant advantages are provided.

In particular, the present invention provides improved operation by avoiding interference with the operation of the window or other transparent material to which it is attached.

The present invention provides for improved readability in that both indoor and outdoor temperature indications are read from a single graduated scale.

Furthermore, the present invention provides for improved readability in that means are provided for substantially reducing condensation or fogging on the window portion of the indoor and the outdoor units.

Of independent significance is the improved operation and sustained life of the bimetallic temperature indication means by virtue of the air circulation panel and drain which substantially reduce the possibility of water damage to the bimetallic coil.

Thus, it is apparent that there has been provided, in accordance with the invention, an indoor/outdoor thermometer that substantially satisfies the objects and advantages set forth above. Although the present invention has been described in conjunction with specific embodiments thereof, it is evident that many alternatives, modifications and variations will be apparent to those skilled in the art in light of the foregoing disclosure of the invention. Accordingly, it is intended that all such alternatives, modifications and variations which fall within the spirit and scope of the invention as defined in the appended claims, be embraced thereby.

What is claimed is:

1. An indoor/outdoor thermometer apparatus comprising:
   bisegmental temperature indicating means for simultaneously providing a relative temperature indication in connection with a first side of a sheet of transparent material and a relative temperature indication in connection with a second side of the sheet material, said bisegmental temperature indicating means comprising:
   a first housing carrying:
      first temperature sensing means attachable to a first side of a sheet of transparent material; and
      first pointer means mounted for angular displacement in response to the sensing of a temperature change by said first sensing means for providing a relative indication of a temperature being sensed;
   a second housing unattached relative to said first housing and carrying:
      second temperature sensing means attachable to a second side of the sheet of transparent material; and
      second pointer means mounted for angular displacement in response to the sensing of a temperature change by said second sensing means for providing a relative indication of a temperature being sensed;
      said second pointer means being visible through said first and second housing means;
   each housing including adhesive attachment means operable to attach said first and second housings to the sheet of transparent material independently of each other to permit said bisegmental temperature indicating means to be attached at any preselected position on the transparent sheet of transparent material;
   said attachment means being disposed relative to said first and second pointer means such that said first and second pointer means are visible through transparent portions of said first housing when said first and second housings are attached to the sheet of transparent material;
   one of said housings including graduated scale means cooperable with said first and second temperature sensing means for simultaneously providing on a single scale temperature readings for both sides of the sheet of transparent material; and
   each of said housings including visual alignment means for aligning said first and second housings to orient said first and second pointers for substantially co-axial displacement in substantially superimposed paths along said graduated scale to permit a temperature reading of both sides of the sheet of transparent material to be taken simultaneously in connection with the single scale.

2. The indoor/outdoor thermometer apparatus of claim 1 wherein said first and second temperature sensing means comprise bimetallic coils.

3. The indoor/outdoor thermometer apparatus of claim 2 and further including moisture control means comprising:
   air circulation means disposed on said first and said second temperature sensing means for providing air circulation therein;
   inclined surface means in said first and said second temperature sensing means for directing to a drain means droplets of water which may be present therein; and
   drain means in said first and said second temperature sensing means and cooperable with said inclined surface means for controling droplets of water therein.

4. The indoor/outdoor thermometer apparatus of claim 1 wherein said alignment means comprises a first pair of surfaces operable to provide an indication of angular misalignment and a second pair of surfaces operable to provide an indication of offset misalignment.

5. The indoor/outdoor thermometer apparatus of claim 1 wherein said attachment means comprises tape means having a plurality of adhesive faces and a layer of foam-like material means interposed between said faces for maintaining each of said first and second temperature sensing means in a spaced apart relationship with respect to said sheet of transparent material to thermally insulate said first and said second temperature sensing means from said sheet of transparent material.

6. The indoor/outdoor thermometer apparatus of claim 1 and further including passage means for providing fluid communication between an interior portion and an exterior portion of said first and said second temperature sensing means respectively for reducing a time lag between a change in temperature on the exterior of said sensing means and a change in temperature on the interior of said sensing means.

7. An indoor/outdoor thermometer apparatus comprising:
bisegmental temperature indicating means for simultaneously providing a relative temperature indication in connection with indoor and outdoor sides of a sheet of transparent material, said bisegmental temperature indicating means comprising:
first housing means having front and rear wall means, each including a transparent face portion;
a first pointer mounted on said first housing means between said first front and rear wall means and being angularly displaceable;
first temperature sensing means disposed between said first front and rear wall means and being connected to said first pointer for producing angular displacement of said first pointer in response to sensed changes in temperature at an indoor side of the sheet of transparent material;
first air circulation openings located in said first housing means exclusive of said rear wall means for providing air circulation around said first temperature sensing means;
first adhesive means disposed on said first rear wall means for securing said first housing means to said indoor side of the sheet of transparent material such that said first pointer is visible through said front and rear transparent faces, and with said first rear wall means being spaced from the indoor side of the sheet of transparent material;
second housing means, unattached relative to said first housing means, and having second front and rear wall means, each including a transparent face portion;
a second pointer mounted on said second housing means between said second front and rear wall means and being angularly displaceable;
second temperature sensing means disposed between said second front and rear wall means and being connected to said second pointer for producing angular displacement of said second pointer in response to sensed changes in temperature at an outdoor side of the sheet of transparent material;
second air circulation openings located in said second housing means exclusive of said second wall means for providing air circulation around said second temperature sensing means;
second adhesive means disposed on said second rear wall means for securing said second housing means to an outdoor side of the sheet of transparent material independently of the securance of said first housing means to the indoor side of the sheet of material, and such that said second pointer is visible through said second rear wall means as well as through said first front and rear wall means, with said second rear wall means being spaced from said second side of the sheet of transparent material;
one of said transparent face portions of said first and second housing means including a graduated scale for providing a temperature indication for both of said first and second pointers;
said first and second housing means respectively including first and second visual alignment means which are mutually alignable to orient said first and second pointers for substantially coaxial displacement in superimposed paths of travel along said graduated scale;
said first and second pointers being cooperable to provide, when said first and second housing means have been aligned by said alignment means, a simultaneous relative temperature indication, in connection with said graduated scale means, of the indoor and outdoor sides of the sheet of transparent material.

8. Apparatus according to claim 7 wherein said first and second rear transparent faces are planar in shape, said first and second adhesive means being mounted on said first and second transparent faces so as to space said transparent faces from the transparent sheet by a distance substantially equal to the thickness of the adhesive means.

9. Apparatus according to claim 8 wherein each of said pointers includes a lower mounting part mounted adjacent the front wall means of its respective housing means and an upper indicator part displaced rearwardly therefrom so as to be located closer to said rear wall means; each of said temperature sensing means being connected to an adjustment means accessible through said rear wall means, said first and second adhesive means being disposed on said first and second rear wall means to cover said adjustment means.

10. Apparatus according to claim 7 wherein said first and second temperature sensing means each comprise a bimetallic coil; and said first and second air circulation openings are disposed below the first and second temperature sensing means to resist the collection of moisture onto said temperature sensing means.

* * * * *